(12) United States Patent
Lee

(10) Patent No.: US 7,746,576 B2
(45) Date of Patent: Jun. 29, 2010

(54) LENS MODULE

(75) Inventor: Wei-Chin Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 98 days.

(21) Appl. No.: 12/109,674

(22) Filed: Apr. 25, 2008

(65) Prior Publication Data

US 2009/0073582 A1 Mar. 19, 2009

(30) Foreign Application Priority Data

Sep. 14, 2007 (CN) .......................... 2007 1 0201703

(51) Int. Cl.
*G02B 7/02* (2006.01)
(52) U.S. Cl. ...................................... 359/811; 359/819
(58) Field of Classification Search ................. 359/811, 359/819
See application file for complete search history.

(56) References Cited

U.S. PATENT DOCUMENTS

| 6,026,244 A | 2/2000 | Tanaka |
| 6,144,504 A | 11/2000 | Sudoh et al. |
| 2005/0237418 A1* | 10/2005 | Sakamoto ................... 348/340 |

FOREIGN PATENT DOCUMENTS

CN          1854783 A          11/2006

* cited by examiner

*Primary Examiner*—Jordan M. Schwartz
*Assistant Examiner*—James C Jones
(74) *Attorney, Agent, or Firm*—Andrew C. Cheng

(57) ABSTRACT

A lens module includes a lens holder, a lens, a set collar, and an adhesive to adhere the set collar to the lens holder. The lens is received in the lens holder, and includes an optical portion, and a locating portion around the optical portion. The set collar holds the lens in the lens holder, and defines a central opening aligned with the lens. The set collar defines three cutouts therein and forms three blocks between the cutouts. The locating lens forms three ribs received in the cutouts and interlocked with the blocks, respectively.

10 Claims, 3 Drawing Sheets

LENS MODULE

TECHNICAL FIELD

The present invention relates to a lens module and, particularly, to a lens module for use in a portable electronic device.

BACKGROUND

Generally, a lens module includes a lens barrel, lenses received in the lens barrel, and a set collar secured to the lens barrel by an adhesive for holding the lenses in the lens barrel. The lens barrel comprises a stepped inner wall for supporting the lenses thereon. Each lens comprises a central optical portion and a circumferential locating portion with lower and outer surfaces thereof engaging with the stepped inner wall of the lens barrel. The set collar is configured as an annular ring corresponding to the locating portion of the uppermost lens and holds the uppermost lens in the lens barrel. The set collar also defines a central opening which is aligned with the optical portions of the lenses when the set collar is placed on the uppermost lens. An outer surface of the annular portion of the set collar abuts closely against the stepped inner wall of the lens barrel to isolate the lenses from an exterior of the lens barrel. The set collar forms an annular flange surrounding a central opening defined in the set collar. A space defined between the flange and the lens barrel is filled with the adhesive to fix the set collar to the lens barrel, and thus the lenses are held in the lens barrel.

In the case mentioned above, the lenses cannot be adjusted relative to the lens barrel, once the set collar is placed into the lens barrel. Therefore, before the set collar is placed into the lens barrel, the lenses must already be accurately positioned. However, the lenses, especially the uppermost lens, are prone to shifting during assembly of the set collar into the lens barrel. This shifting of the lenses cannot be adjusted unless the set collar is removed from the lens barrel. In addition, because the outer surface of the annular portion of the set collar abuts closely against the stepped inner wall of the lens barrel, the adhesive is merely applied between the set collar and the lens barrel, and the reliability of the lens module is low.

Therefore, what is desired is a lens module with high reliability and precise positioning of lenses therein.

SUMMARY

According to a present embodiment, a lens module includes a lens holder, a lens, a set collar, and an adhesive to adhere the set collar to the lens holder. The lens is received in the lens holder, and includes an optical portion, and a locating portion around the optical portion. The set collar holds the lens in the lens holder, and defines a central opening aligned with the lens. The set collar defines three cutouts therein and forms three blocks between the cutouts. The locating lens forms three ribs received in the cutouts and interlocked with the blocks respectively.

Those and other advantages and novel features will be more readily apparent from the following detailed description set forth below taken in conjunction with the accompanying drawings.

DETAILED DESCRIPTION OF THE EMBODIMENTS

Figure 1:
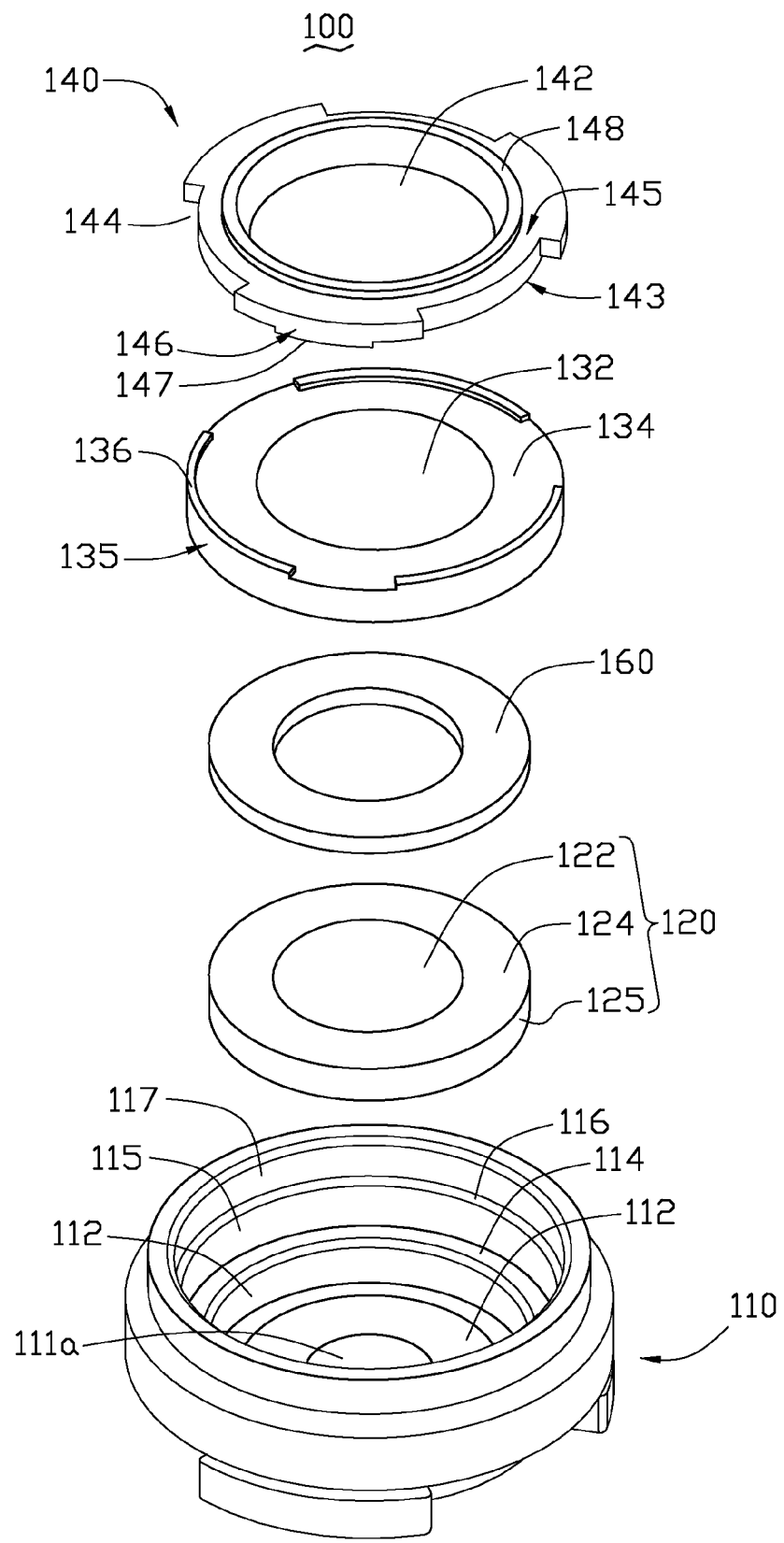
FIG. 1 is an exploded, isometric view of a lens module, according to one embodiment.
Figure 2:
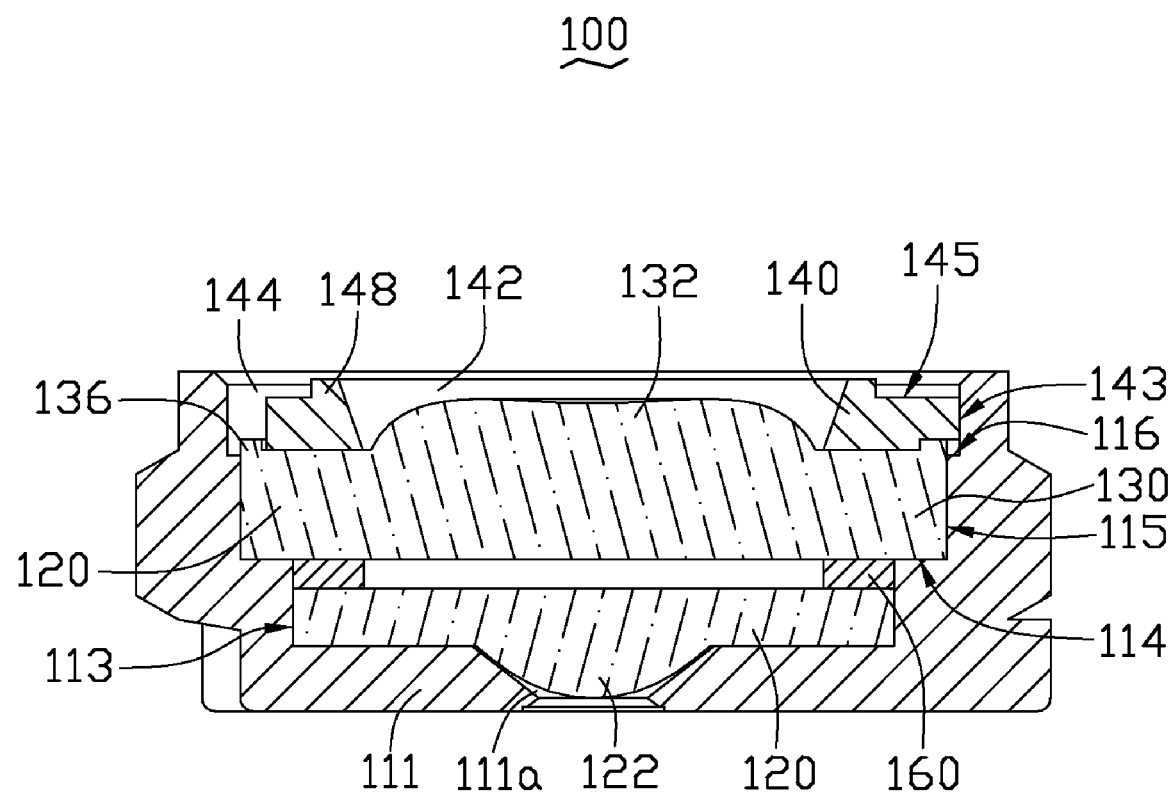
FIG. 2 is a diagram of an assembly of the lens module of FIG. 1.
Figure 3:
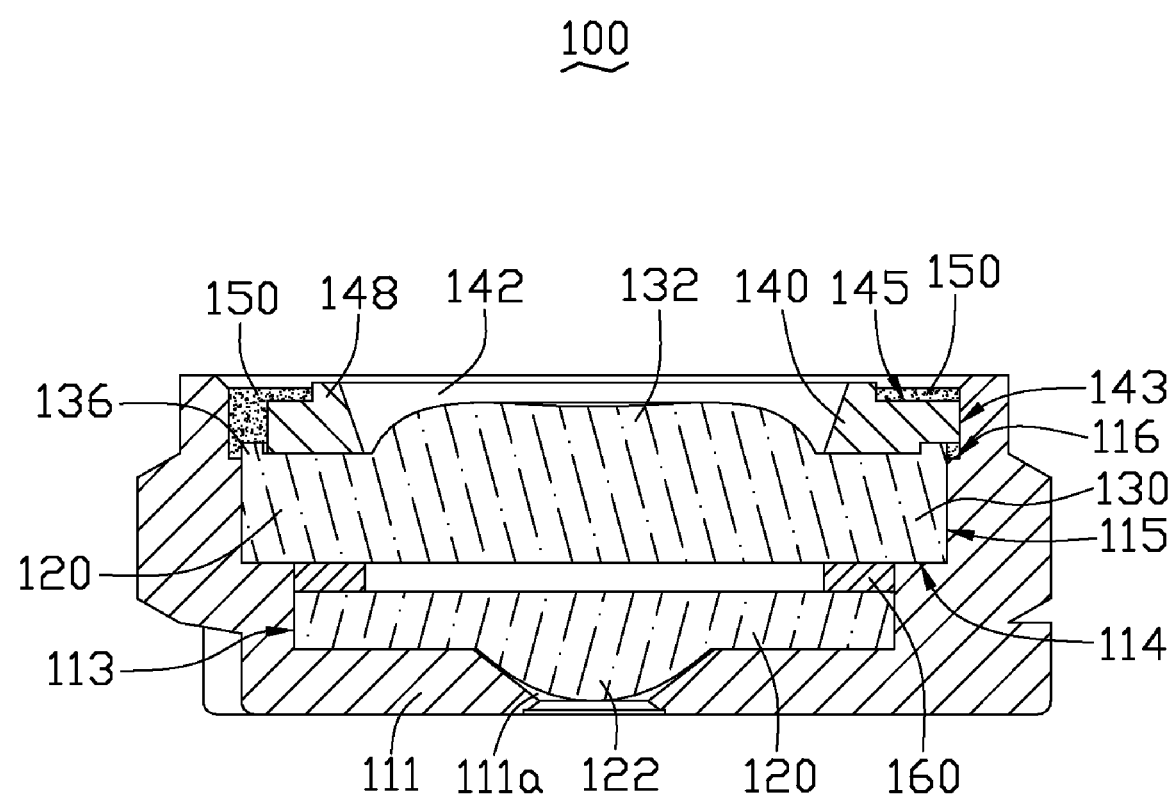
FIG. 3 is similar to FIG. 2, with the addition of an adhesive applied in the lens module.

Referring to FIGS. 1-3, a lens module 100 according to an embodiment comprises a lens holder 110, two lenses 120, 130 received in the lens holder 110, a set collar 140 disposed in the lens holder on the lens 130 for fixing the lenses 120, 130 in the lens holder 110, and an adhesive 150 applied between the set collar 140, the lens 130 and the inner side of the lens holder 110 to connect them together securely.

The lens holder 110 forms inner steps 112-116, and inner walls 113-117 alternately arranged with the steps 112-116. The step 112 is the lowest step, and is connected to a bottom extremity 111 inside the lens holder 110. The bottom extremity 111 defines an aperture 111a therein for providing a path for light incident from outside. The lenses 120, 130 are respectively supported on the steps 112, 114, and abut against the walls 113, 115.

The lens 120 includes a central optical portion 122, and a locating portion 124 surrounding the optical portion 122. The locating portion 124 is located on the step 112 of the lens holder 110 when the lens 120 is positioned in the lens holder 110. The locating portion 124 defines an outermost circumferential surface 125 abutting against the wall 113 of the lens holder 110 when the locating portion 124 is located on the step 112 of the lens holder 110.

The lens 130 is axially aligned with the lens 120, and comprises a central optical portion 132, and a locating portion 134 surrounding the optical portion 132. The locating portion 134 is located on the step 114 of the lens holder 110 when the lens 130 is positioned in the lens holder 110. The locating portion 134 defines a circumferential outer surface 135 abutting against the wall 115 of the lens holder 110 when the locating portion 134 is located on the step 114 of the lens holder 110. Three ribs 136 extend upwardly from a periphery of the locating portion 134 of the lens 130, at uniform intervals. Outer surfaces of the ribs 136 and the circumferential outer surface 135 are coplanar. Referring to FIGS. 2-3, the ribs 136 protrude beyond the step 116 defining a space between the protruding portion of the ribs 136 and the wall 117, when the lens 130 is located on the step 114 of the lens holder 110. Understandably, between the lenses 120, 130, an annular spacer 160 can be employed to accurately maintain a desired space between the lenses 120, 130 and to firmly hold the lens 120 in the lens holder 110.

The set collar 140 comprises a bottom surface 143, an opposite top surface 145, and a circumferential outer surface 146. The set collar 140 defines a central opening 142 extending through the top and bottom surfaces 145, 143 and coaxially aligned with the lenses 120, 130, and three circumferential outer cutouts 144 extending through the top and bottom surfaces 145, 143 at uniform intervals corresponding to the ribs 136, respectively, and partitioned by three blocks 147 formed at the lower surface 143. The set collar 140 further comprises an annular flange 148 surrounding the opening 142.

Particularly referring to FIGS. 2-3, when the lenses 120, 130 and the set collar 140 are placed into the lens holder 110, the ribs 136 are disposed between the lens holder 110 and the set collar 140 and are received in the cutouts 144. The blocks 147 are disposed between the ribs 136 of the lens 130, so that the ribs 136 and the blocks 147 are interlocked with each other in a circumferential direction of the lens module 100. When the set collar 140 is rotated, the lens 130 is driven to rotate in response by the blocks 147 to the ribs 136 and the center of the lens 130, aligning the optical axis thereof. It is understood that in other embodiments, the set collar can form a plurality of ribs, and the uppermost lens can define a plurality of cutouts and a plurality of blocks between the cutouts, so long as the ribs can be received in the cutouts and interlocked with the blocks.

In addition, in the present embodiment, the cutouts 144 adjoin the wall 117 and provide a path for the adhesive 150, after the adhesive 150 is inserted between the wall 117 and the flange 148, to flow into the cutouts 144 to a location between the wall 117 and the ribs 136, so that the adhering area between the set collar 140 and the lens holder 110 is increased, and the lens 130 is also directly adhered to the lens holder 110 and the set collar 140.

It is understood that in other embodiments, the ribs 136 can be formed on the lens 130 where it is spaced from the circumferential outer surface 135. Thereby the steps 114, 116 of the lens holder 110 can be omitted. The walls 115, 117 of the lens holder 110 are then smoothly connected, and a gap remains between the ribs 136 and the inner side of the lens holder 110 for receiving the adhesive therein to connect the lens 130 to the lens holder 110 firmly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A lens module comprising:
    a lens holder;
    a lens received in the lens holder, the lens comprising an optical portion, and a locating portion around the optical portion;
    a set collar holding the lens in the lens holder, the set collar defining a central opening aligned with the lens, one of the set collar and the locating portion of the lens defining a group of cutouts therein and forming a group of blocks between the cutouts, the other one of the set collar and the locating portion forming a group of ribs received in the cutouts and interlocked with the blocks, respectively; and
    an adhesive adhering the set collar and the lens to the lens holder.

2. The lens module as claimed in claim 1, wherein the lens holder comprises an inner step and an inner wall connecting with the step, and the lens is supported on the step and abuts against the wall.

3. The lens module as claimed in claim 1, wherein the ribs are formed on the locating portion of the lens, the cutouts are defined in the set collar, and the blocks are disposed between the ribs.

4. The lens module as claimed in claim 3, wherein the ribs are at uniform intervals.

5. The lens module as claimed in claim 3, wherein the set collar comprises an annular flange surrounding the central opening, and the annular flange is separated from the wall of the lens holder for receiving the adhesive.

6. The lens module as claimed in claim 5, wherein the cutouts adjoin to the wall of the lens holder, and allow the adhesive to flow to the ribs.

7. The lens module as claimed in claim 6, wherein the ribs are separated from the wall of the lens holder, and the adhesive is filled between the ribs and the wall to adhere the lens to the lens holder.

8. The lens module as claimed in the claim 2, wherein the lens module includes an additional lens below the lens against the set collar, the lens holder includes an additional inner step and an additional inner wall, and the additional lens is supported by the additional step and abuts against the additional wall of the lens holder.

9. The lens module as claimed in the claim 8, wherein the lens module further includes an annular spacer disposed between the lens and the additional lens for spacing them from each other.

10. The lens module as claimed in the claim 1, wherein the ribs of the lens are formed on the center area and are spaced from the lens holder, and an adhesive fills between the ribs and the lens holder to adhere the ribs to the lens holder.

* * * * *